(12) United States Patent  
Sood

(10) Patent No.: US 12,418,850 B2  
(45) Date of Patent: Sep. 16, 2025

(54) DISABLING ROAMING IN OVERLAPPING COVERAGE AREAS OF WIRELESS TELECOMMUNICATIONS NETWORKS

(71) Applicant: T-Mobile USA, Inc., Bellevue, WA (US)

(72) Inventor: Romil Kumar Sood, Bothell, WA (US)

(73) Assignee: T-Mobile USA. Inc., Bellevue, WA (US)

( * ) Notice: Subject to any disclaimer, the term of this patent is extended or adjusted under 35 U.S.C. 154(b) by 351 days.

(21) Appl. No.: 17/897,097

(22) Filed: Aug. 26, 2022

(65) Prior Publication Data

US 2024/0073784 A1   Feb. 29, 2024

(51) Int. Cl.
- H04W 48/04 (2009.01)
- H04W 8/02 (2009.01)

(52) U.S. Cl.
CPC ............. H04W 48/04 (2013.01); H04W 8/02 (2013.01)

(58) Field of Classification Search
CPC .......... H04W 48/04; H04W 8/02; H04W 8/12
See application file for complete search history.

(56) References Cited

U.S. PATENT DOCUMENTS

| | | |
|---|---|---|
| 6,542,497 B1 | 4/2003 | Curry et al. |
| 6,560,223 B1 | 5/2003 | Egan et al. |
| 6,680,922 B1 | 1/2004 | Jorgensen |
| 6,757,268 B1 | 6/2004 | Zendle |
| 6,862,622 B2 | 3/2005 | Jorgensen |
| 6,865,170 B1 | 3/2005 | Zendle |
| 7,010,002 B2 | 3/2006 | Chow et al. |
| 7,035,932 B1 | 4/2006 | Dowling |
| 7,047,008 B2 | 5/2006 | Martlew |
| 7,133,670 B1 | 11/2006 | Moll et al. |
| 7,133,678 B1 | 11/2006 | Berkowitz et al. |
| 7,142,843 B2 | 11/2006 | Dowling et al. |
| 7,146,636 B2 | 12/2006 | Crosbie |
| 7,151,931 B2 | 12/2006 | Tsao et al. |
| 7,171,209 B2 | 1/2007 | Numminen et al. |
| 7,197,569 B2 | 3/2007 | Dowling |
| 7,292,592 B2 | 11/2007 | Rune |
| 7,293,110 B2 | 11/2007 | Dowling |
| 7,299,069 B2 | 11/2007 | Claussen |

(Continued)

FOREIGN PATENT DOCUMENTS

| | | |
|---|---|---|
| CN | 102244857 B | 5/2015 |
| CN | 104661280 A | 5/2015 |

(Continued)

*Primary Examiner* — Shah M Rahman  
(74) *Attorney, Agent, or Firm* — Perkins Coie LLP

(57) ABSTRACT

A telecommunications network provides selective roaming for user equipment (UE) devices registered to the network, allowing some UE devices to operate on a roaming network in some geographic regions and disallowing other UE devices to access roaming networks. While a target UE device is operating on a roaming network, the telecommunications network monitors changes in location of the target device. If the target UE device is detected to have moved into an overlapping coverage area, covered by both the telecommunications network and the roaming network, the telecommunications network generates a command to cancel the subscription of the target UE device to the roaming network.

19 Claims, 11 Drawing Sheets

(56) References Cited

U.S. PATENT DOCUMENTS

| | | | |
|---|---|---|---|
| 7,305,229 B2 | 12/2007 | Fox et al. |
| 7,433,929 B2 | 10/2008 | Guilford et al. |
| 7,483,698 B2 | 1/2009 | Hurtta |
| 7,581,030 B2 | 8/2009 | Dowling |
| 7,613,142 B2 | 11/2009 | Molteni et al. |
| 7,634,269 B2 | 12/2009 | Gallagher |
| 7,640,008 B2 | 12/2009 | Gallagher et al. |
| 7,747,251 B1 | 6/2010 | Pippert et al. |
| 7,805,161 B1 | 9/2010 | Jones et al. |
| 7,843,900 B2 | 11/2010 | Gallagher et al. |
| 7,894,812 B1 | 2/2011 | Durig et al. |
| 7,899,451 B2 | 3/2011 | Hu et al. |
| 7,933,595 B2 | 4/2011 | Pippert et al. |
| 7,949,326 B2 | 5/2011 | Gallagher et al. |
| 7,979,086 B1 | 7/2011 | Jones et al. |
| 8,045,493 B2 | 10/2011 | Gallagher et al. |
| 8,060,084 B2 | 11/2011 | Buckley et al. |
| 8,078,164 B2 | 12/2011 | Ganesan |
| 8,086,239 B2 | 12/2011 | Elmaleh |
| 8,144,672 B2 | 3/2012 | Pandey et al. |
| 8,189,548 B2 | 5/2012 | Caldwell et al. |
| 8,204,543 B2 | 6/2012 | Keevill et al. |
| 8,213,424 B2 | 7/2012 | Jabbari et al. |
| 8,228,870 B1 | 7/2012 | Sigg et al. |
| 8,233,899 B1 | 7/2012 | Oroskar et al. |
| 8,238,906 B1 | 8/2012 | Oroskar et al. |
| 8,259,666 B2 | 9/2012 | Bao et al. |
| 8,279,800 B2 | 10/2012 | Schmidt et al. |
| 8,311,536 B1 | 11/2012 | Pulugurta |
| RE43,856 E | 12/2012 | Berkowitz et al. |
| 8,363,626 B2 | 1/2013 | Faccin |
| 8,391,858 B1 | 3/2013 | Vargantwar et al. |
| 8,391,859 B1 | 3/2013 | Pulugurta |
| 8,406,757 B1 | 3/2013 | Singh et al. |
| 8,472,946 B2 | 6/2013 | Chan et al. |
| 8,483,183 B2 | 7/2013 | Liu et al. |
| 8,494,522 B2 | 7/2013 | Chen et al. |
| 8,510,802 B1 | 8/2013 | Singh et al. |
| 8,625,537 B1 | 1/2014 | Sigg et al. |
| 8,644,818 B1 | 2/2014 | Okmyanskiy et al. |
| 8,730,796 B2 | 5/2014 | Samuel et al. |
| 8,886,201 B2 | 11/2014 | Fang et al. |
| 9,137,735 B2 | 9/2015 | Thomas et al. |
| 9,167,410 B1 | 10/2015 | Xue et al. |
| 9,325,621 B1 | 4/2016 | Ramamurthy et al. |
| 9,432,924 B1 | 8/2016 | Singh et al. |
| 9,596,707 B2 | 3/2017 | Zhu et al. |
| 9,622,192 B2 | 4/2017 | Ji |
| 9,736,700 B1 | 8/2017 | Douberley et al. |
| 9,749,899 B2 | 8/2017 | Raleigh et al. |
| 9,781,588 B2 | 10/2017 | Cho et al. |
| 9,832,678 B1 | 11/2017 | Tandon et al. |
| 9,832,797 B2 | 11/2017 | Wang et al. |
| 9,860,827 B2 | 1/2018 | Ji et al. |
| 9,877,253 B1 | 1/2018 | Liu et al. |
| 9,900,765 B2 | 2/2018 | Gonzalez et al. |
| 9,913,154 B2 | 3/2018 | Grischy et al. |
| 9,923,657 B2 | 3/2018 | Forenza et al. |
| 9,949,166 B2 | 4/2018 | Sirotkin et al. |
| 9,974,091 B2 | 5/2018 | Rubin et al. |
| 10,271,298 B1 * | 4/2019 | Yang ................... H04W 48/16 |
| 10,735,940 B1 | 8/2020 | Sharma |
| 10,984,128 B1 | 4/2021 | Hoffer |
| 11,240,729 B1 * | 2/2022 | Xu ..................... H04L 45/123 |
| 2001/0055298 A1 | 12/2001 | Baker et al. |
| 2002/0087674 A1 | 7/2002 | Guilford et al. |
| 2002/0136226 A1 | 9/2002 | Christoffel et al. |
| 2002/0147008 A1 | 10/2002 | Kallio |
| 2002/0181444 A1 | 12/2002 | Acampora |
| 2003/0036374 A1 | 2/2003 | English et al. |
| 2005/0009525 A1 | 1/2005 | Evslin |
| 2005/0030907 A1 | 2/2005 | Lou et al. |
| 2005/0088999 A1 | 4/2005 | Waylett et al. |
| 2005/0232193 A1 | 10/2005 | Jorgensen |
| 2006/0098593 A1 | 5/2006 | Edvardsen et al. |
| 2006/0135160 A1 | 6/2006 | Jiang |
| 2006/0253526 A1 | 11/2006 | Welch et al. |
| 2007/0121540 A1 | 5/2007 | Sharp et al. |
| 2007/0160017 A1 | 7/2007 | Meier et al. |
| 2007/0201469 A1 | 8/2007 | Iyer et al. |
| 2008/0089287 A1 | 4/2008 | Sagfors et al. |
| 2009/0086672 A1 | 4/2009 | Gholmieh et al. |
| 2010/0048205 A1 | 2/2010 | Guilford et al. |
| 2010/0075669 A1 | 3/2010 | Sparks et al. |
| 2010/0093344 A1 | 4/2010 | Chan et al. |
| 2010/0184428 A1 | 7/2010 | Luo |
| 2010/0234022 A1 | 9/2010 | Winterbottom |
| 2013/0288671 A1 * | 10/2013 | Keller ..................... H04W 8/02 |
| | | 455/433 |
| 2014/0169286 A1 * | 6/2014 | Xu .......................... H04W 8/02 |
| | | 370/329 |
| 2014/0293982 A1 * | 10/2014 | Gupta ..................... H04L 41/08 |
| | | 370/338 |
| 2017/0135036 A1 | 5/2017 | Schmidt et al. |
| 2019/0289571 A1 * | 9/2019 | Park ..................... H04W 60/00 |
| 2019/0327663 A1 | 10/2019 | Wirth et al. |
| 2020/0128449 A1 * | 4/2020 | Faus Gregori .. H04W 36/00222 |
| 2021/0136658 A1 * | 5/2021 | Rönneke ............... H04W 48/06 |
| 2021/0168695 A1 * | 6/2021 | Ryu ........................ H04W 8/14 |
| 2022/0124480 A1 * | 4/2022 | Huang .................... H04W 8/12 |
| 2022/0159445 A1 * | 5/2022 | Rajavelu ................. H04W 8/12 |
| 2022/0322066 A1 | 10/2022 | Sood et al. |
| 2022/0330004 A1 | 10/2022 | Sood et al. |
| 2022/0417758 A1 * | 12/2022 | Nooren ................... H04L 47/80 |
| 2023/0106631 A1 | 4/2023 | Venkataraghavan et al. |
| 2023/0276199 A1 * | 8/2023 | Ryu ..................... H04W 84/18 |
| | | 455/456.1 |
| 2023/0291609 A1 | 9/2023 | Lonkar |
| 2023/0308852 A1 | 9/2023 | Srivastava et al. |
| 2024/0064503 A1 | 2/2024 | Sihotang et al. |
| 2024/0064599 A1 | 2/2024 | Sood et al. |
| 2024/0073671 A1 | 2/2024 | Sood |
| 2024/0073784 A1 | 2/2024 | Sood |
| 2024/0205663 A1 | 6/2024 | Arends et al. |
| 2024/0259788 A1 | 8/2024 | Khurana |
| 2024/0267734 A1 * | 8/2024 | Roemer ............... H04W 12/088 |
| 2024/0275760 A1 | 8/2024 | Kaur et al. |

FOREIGN PATENT DOCUMENTS

| | | |
|---|---|---|
| CN | 104378751 B | 1/2019 |
| CN | 113873522 A | 12/2021 |
| CN | 109196890 B | 1/2022 |
| DE | 102017125042 B4 | 10/2021 |
| EP | 1665640 A1 | 6/2006 |
| EP | 2391157 B1 | 11/2015 |
| GB | 2621834 A | 2/2024 |
| GB | 2621835 A | 2/2024 |
| JP | 2009207164 A | 9/2009 |
| JP | 4852339 B2 | 10/2011 |
| JP | 6372726 B2 | 7/2018 |
| JP | 6885970 B2 | 5/2021 |
| KR | 100432462 B1 | 6/2004 |
| KR | 101073372 B1 | 10/2011 |
| KR | 101486740 B1 | 2/2015 |
| KR | 20160108472 A | 9/2016 |
| KR | 102288207 B1 | 8/2021 |
| KR | 102346610 B1 | 1/2022 |
| WO | 9858477 A1 | 12/1998 |
| WO | 9904534 A1 | 1/1999 |
| WO | 03084096 A1 | 10/2003 |
| WO | 2005004523 A2 | 1/2005 |
| WO | 2005025138 A1 | 3/2005 |
| WO | 2005039115 A1 | 4/2005 |
| WO | 2006120533 A2 | 11/2006 |
| WO | 2012019317 A1 | 2/2012 |
| WO | 2013019551 A1 | 2/2013 |
| WO | 2014051630 A1 | 4/2014 |
| WO | 2014084910 A1 | 6/2014 |
| WO | 2014149641 A1 | 9/2014 |
| WO | 2014185987 A1 | 11/2014 |
| WO | 2015199881 A1 | 12/2015 |
| WO | 2017059891 A1 | 4/2017 |

(56) References Cited

FOREIGN PATENT DOCUMENTS

| WO | 2017210447 A1 | 12/2017 |
|----|---------------|---------|
| WO | 2018127505 A1 | 7/2018  |
| WO | 2022026143 A1 | 2/2022  |
| WO | 2024149512 A1 | 7/2024  |

* cited by examiner

DISABLING ROAMING IN OVERLAPPING COVERAGE AREAS OF WIRELESS TELECOMMUNICATIONS NETWORKS

BACKGROUND

Wireless telecommunications networks typically operate in limited geographic regions. Under some circumstances, wireless devices registered to one operator's network desire to operate outside of the geographic region supported by that network. If another telecommunications network operates in the region, the wireless device can use the other network as a roaming network. However, the infrastructure to support roaming to other telecommunications networks can be expensive and burdensome for a telecommunications network to maintain.

BRIEF DESCRIPTION OF THE DRAWINGS

Detailed descriptions of implementations of the present invention will be described and explained through the use of the accompanying drawings.

Figure 1:
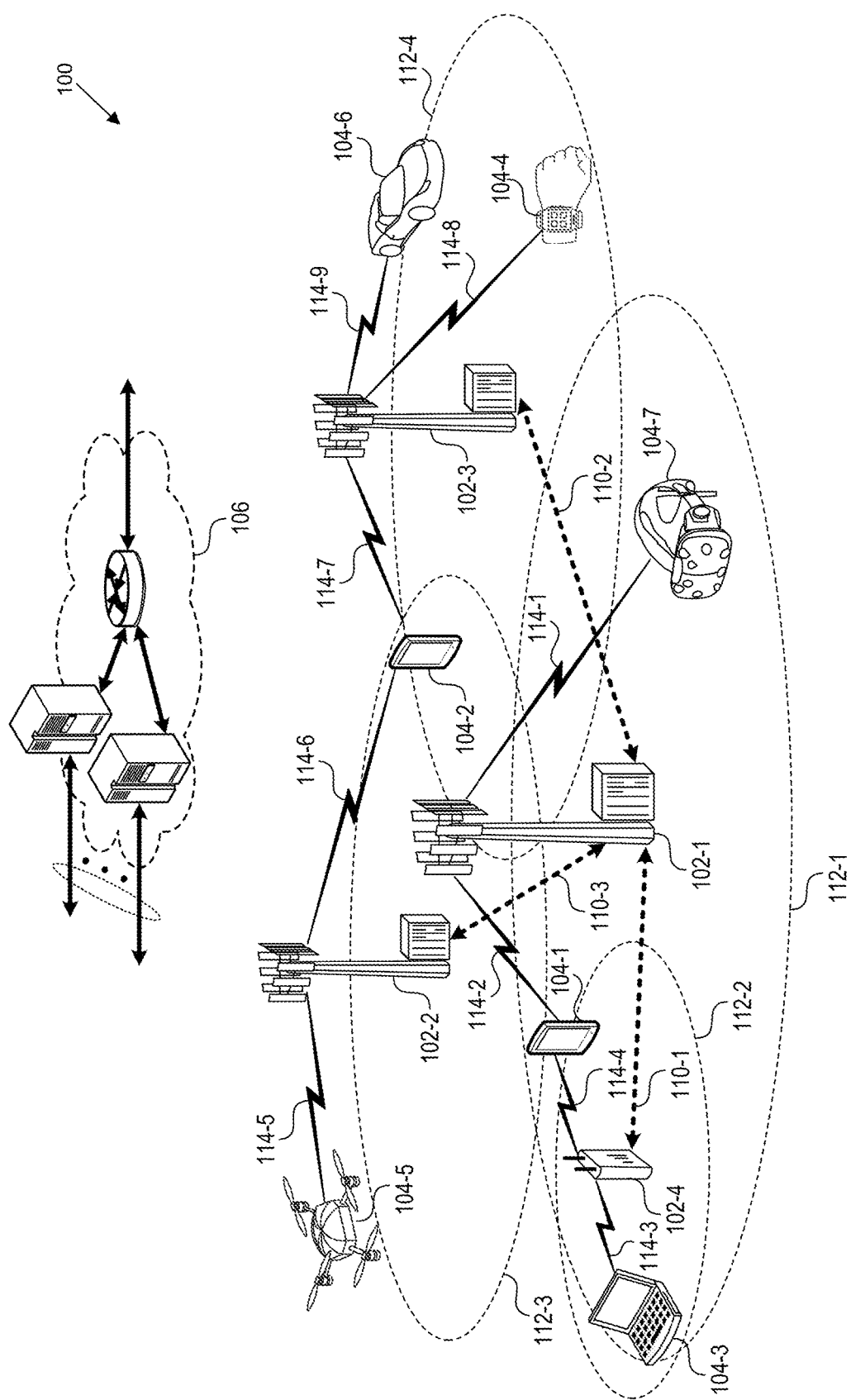
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Some customers of telecommunications networks desire to enable roaming functionality that allows the customer to occasionally use service of another telecommunications network. For example, a customer who lives or works in an area with limited coverage by their registered home cellular/telecommunications network, or who frequently travels to an area with limited or no coverage by the home network, may desire to use service of another telecommunications network that has more reliable coverage in those areas. Under conventional techniques, a telecommunications network typically must either enable roaming for all its customers or for none of its customers. Because roaming support can be expensive and burdensome for a telecommunications network to maintain, an operator of the network may not want to enable roaming functionality for all its customers.

To support a subset of customers for whom roaming functionality improves the customer's experience with a telecommunications network while limiting the burden of supporting roaming infrastructure, the inventors have conceived of and reduced to practice techniques to enable selective roaming in a wireless telecommunications network. According to implementations described herein, the telecommunications network maintains a set of roaming permissions that specify whether a particular wireless device is permitted to access roaming networks, as well as particular geographic region(s) in which the device can access a roaming network. When a wireless device requests to attach to a roaming network, the telecommunications network queries the roaming permissions and grants the request if the wireless device is accessing a permitted roaming network in a permitted location.

When a wireless device, while attached to a roaming network, moves into an area of overlapping coverage between the roaming network and the device's home network, the home network may desire to cause the wireless device to operate on the home network rather than the roaming network because access to the roaming network is not needed in the overlapping coverage area. To identify when a wireless device moves into the overlapping coverage area, the home network monitors changes in location of the wireless device by, for example, receiving Tracking Area Updates (TAUs) generated by the wireless device or receiving Modify Bearer Requests (MBRs) generated by the wireless device. The location of the wireless device is decoded from the TAU or MBR and compared to known coverage areas of the home network or known overlapping coverage areas between the home and roaming networks. When the wireless device is determined to be located in an overlapping coverage area, the home network generates a command to cancel the subscription of the wireless device to the roaming network.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include hand-held mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/ gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

5G Core Network Functions

Figure 2:
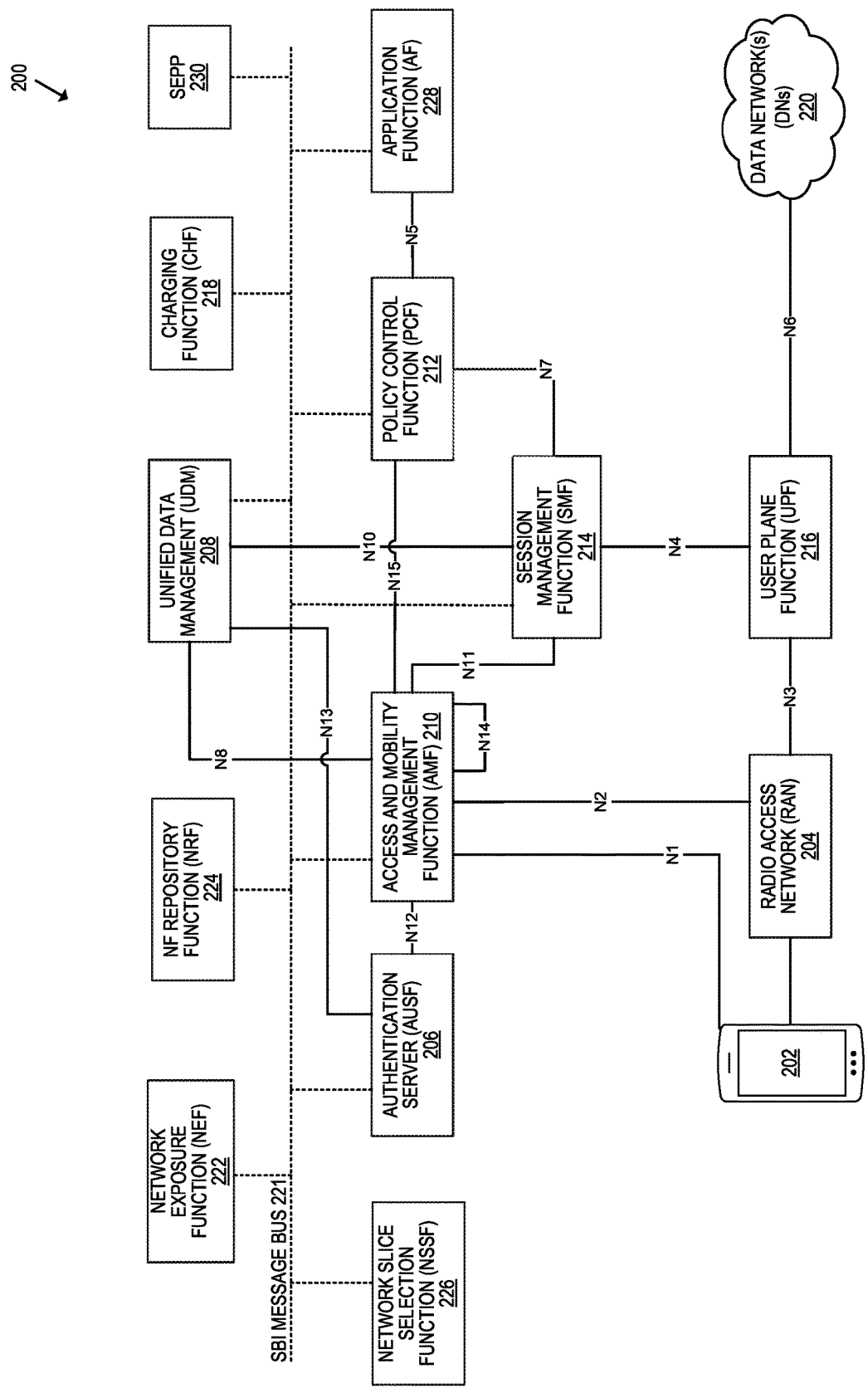
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224, a Network Slice Selection Function (NSSF) 226, and other functions such as a Security Edge Protection Proxy (SEPP) 230 or a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

The SEPP 230 facilitates secure interconnection between 5G networks. The SEPP 230 can route signaling messages between operator networks, serving as an interface for the wireless device 202 to operate on another operator's network as a roaming network.

4G Core Network Functions

Figure 3:
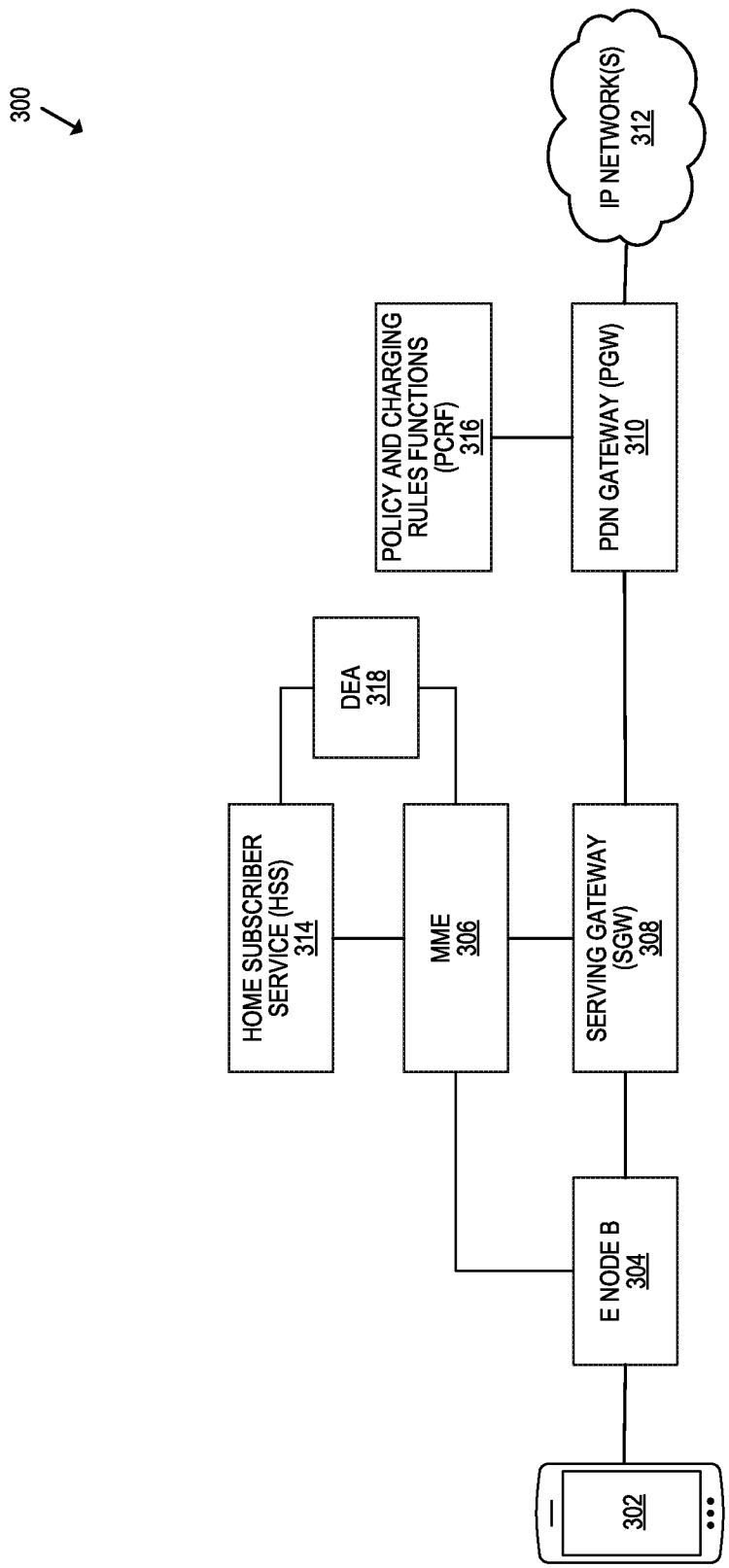
FIG. 3 is a block diagram that illustrates 4G core functions that can implement aspects of the present technology.

FIG. 3 is a block diagram that illustrates an architecture 300 including 4G core functions that can implement aspects of the present technology. A wireless device 302 can access the 4G network through a NAN (e.g., eNodeB 304) of a RAN. The functions of the 4G architecture include a mobility management entity (MME) 306, a serving gateway (SGW) 308, a packet data network gateway (PDN gateway or PGW) 310, a home subscriber service (HSS) 314, a policy and charging rules functions (PCRF) 316, and a diameter edge agent (DEA) 318. These components can reside on nodes within a core packet-switched network operated by an LTE service provider, and their functionality can be split onto different physical nodes or merged onto shared-functionality nodes. Communications between the components can be enabled by interfaces such as virtual tunnels that are defined by relevant standards.

The MME 306 provides mobility and session management to UEs. Operating as a network controller, the MME 306 can establish and maintain bearers as well as establish connection and security between the UE and the 4G core network. The HSS 314 stores data for customer profiles and creates authentication vectors for use by the MME 306. The DEA 318 routes signaling messages between operator networks, serving as an interface for the wireless device 302 to operate on another operator's network as a roaming network.

Each NAN 304 has a communication interface with the SGW 308, which in turn has a communication interface with the PGW 310 that provides connectivity with an IP network 312 such as the Internet. The SGW 308 routes and forwards user data packets to or from the UE. The SGW 308 can furthermore facilitate handovers of the UE from the 4G network to another 4G network.

The PGW 310 provides a UE with access to a PDN by assigning an Internet protocol (IP) address to the UE. In an LTE network, the PGW 310 can assign addresses based on both IP version 4 (IPv4) and IP version 6 (IPv6). The PGW 310 can further perform functions such as policy enforcement, packet filtering, and charging as packets are routed from the UE to the IP network 312 or from the IP network 312 to the UE. Quality of service information used by the PGW 310 can be supplied by the PCRF 316, including charging rules, flow control rules, or traffic priority.

Customized Roaming in Telecommunications Networks

A telecommunications network has coverage areas, representing geographic areas in which the telecommunications network operates. For example, the coverage area of a network includes any geographic area within a specified distance from a NAN affiliated with the telecom provider, such that electronic devices within the specified distance from the NAN can communicate with the NAN. At times, it is beneficial for an electronic device that is registered to operate on a network maintained by a particular telecommunications provider to communicate with a NAN registered to a different telecommunications provider. For example, if the electronic device is operating in a geographic region that is outside the coverage area of its home network, the user of the electronic device may desire to access a roaming network from another telecommunications provider in order to enable the electronic device to send and receive data over the network. However, it can be expensive and burdensome for a telecommunications network to enable its electronic devices to operate on a roaming network.

To balance the need for some electronic devices to access roaming networks against the cost and burden of maintaining the infrastructure to facilitate such roaming, a telecommunications network according to implementations herein facilitates selective roaming, in which some electronic devices are allowed to operate on a roaming network while others are not. For example, a telecommunications network configures customer accounts for a subset of its customers to allow the customers in the subset to access roaming networks in particular geographic areas where the telecommunications network has limited or no coverage available.

Figure 4:
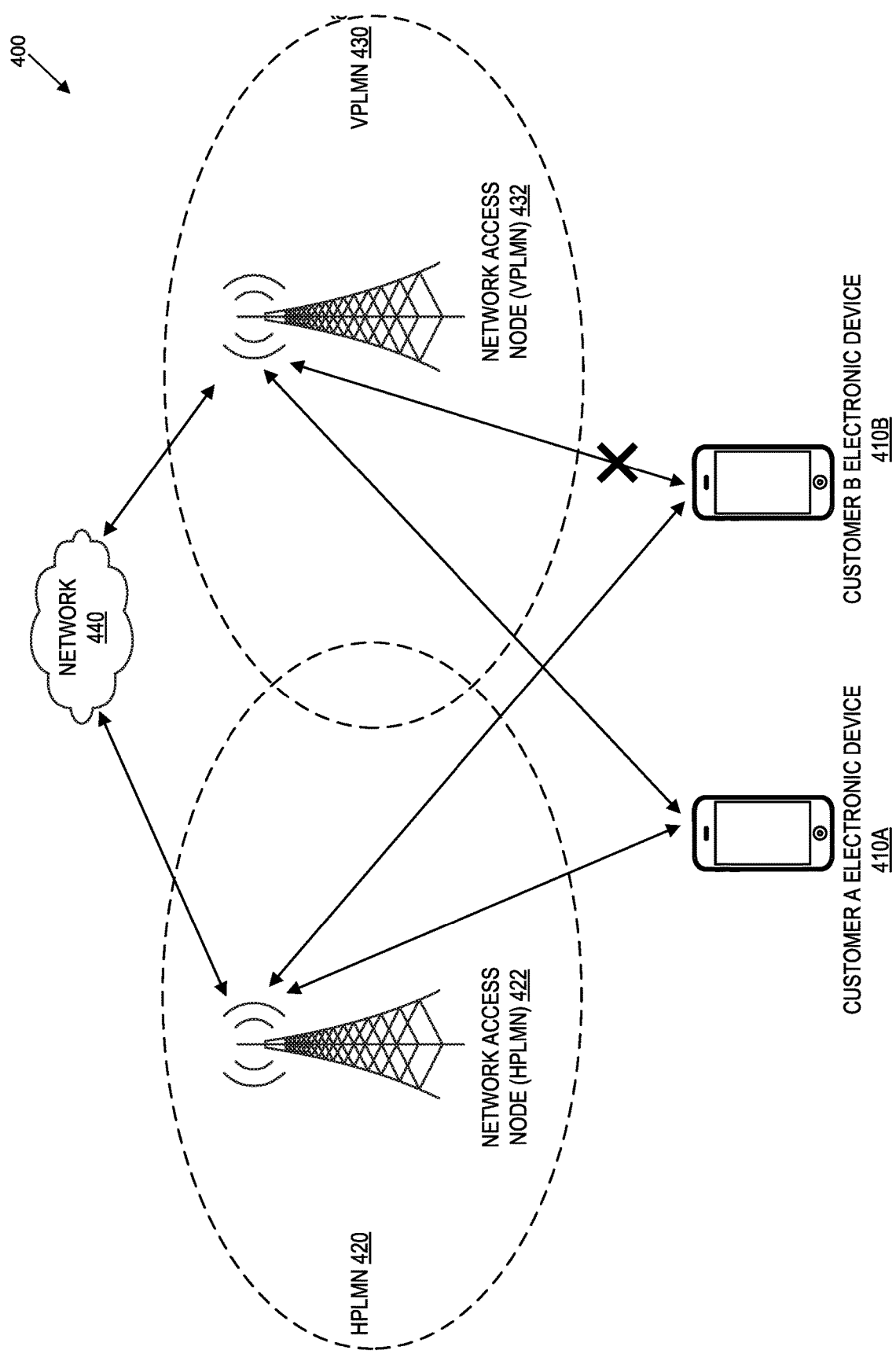
FIG. 4 illustrates an example network environment in which selective roaming is enabled.

FIG. 4 illustrates an example network environment 400 in which selective roaming is enabled. In the environment 400, electronic devices (including an electronic device 410A associated with a customer A and an electronic device 410B associated with a customer B) transmit and receive data over a network 440 by sending data to and receiving data from one or more network access nodes (NANs) 422, 432.

The electronic devices 410 are registered to a first telecommunications network and configured to operate on the first network. The NAN 422 is likewise associated with the first telecommunications network, and thus is part of a home public land mobile network (HPLMN) 420 that represents a combination of wireless communication services offered by the first telecommunications operator.

The second NAN 432 is associated with a second telecommunications network. When the NAN 432 is used by the electronic devices registered to the first telecommunications network, the NAN 432 functions as part of a visiting public land mobile network (VPLMN) 430 that represents a combination of communication services offered by the second telecommunications operator on a roaming basis.

In the network environment 400 according to implementations herein, the HPLMN 420 selectively permits electronic devices 410 to access the VPLMN 430 and associated roaming functionality provided by the second telecommunications network operator. For example, the electronic device 410A associated with Customer A is permitted to access the VPLMN 430 when the device is located within the coverage area of the second telecommunications network, while the electronic device 410B associated with Customer B is not permitted to access the roaming network.

Figure 5:
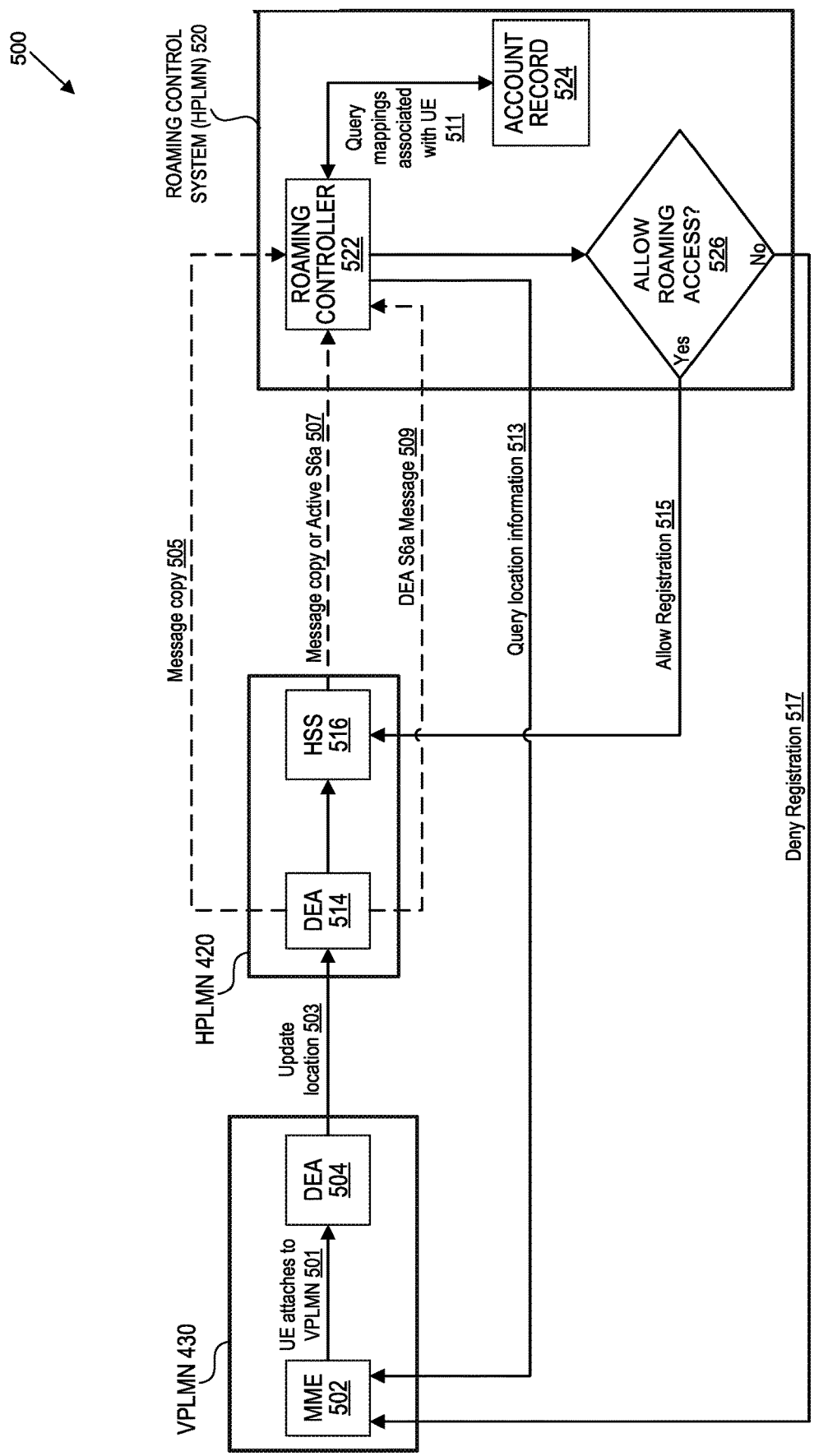
FIG. 5 illustrates a selective roaming process performed between 4G networks, according to some implementations.
Figure 6:
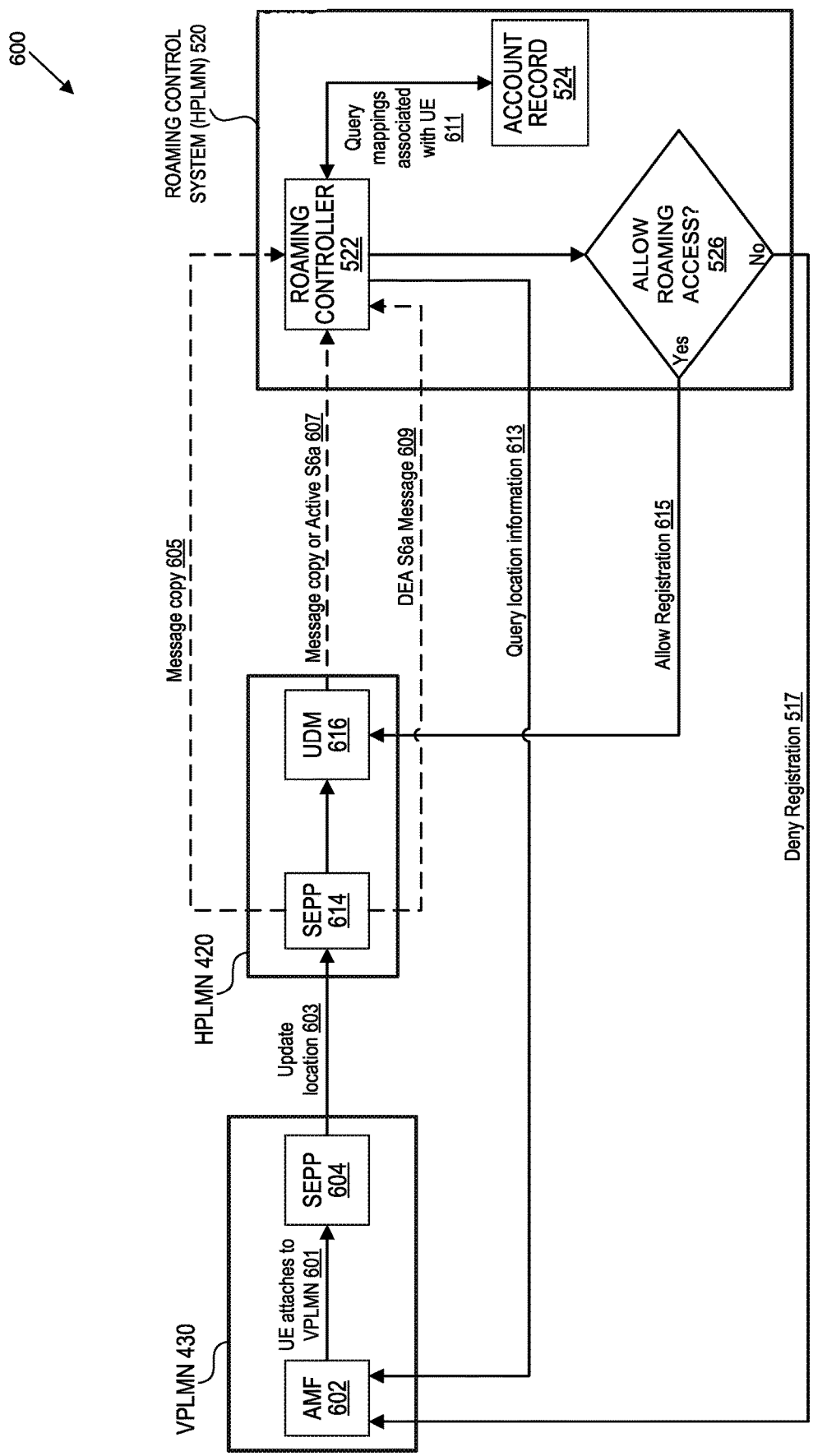
FIG. 6 illustrates a selective roaming process performed between 5G networks, according to some implementations.

FIGS. 5-6 illustrate processes for selectively permitting access to a roaming network, according to some implementations. FIG. 5 illustrates an implementation of a selective roaming process 500 when the applicable telecommunications networks are 4G networks, while FIG. 6 illustrates an implementation of a selective roaming process 600 when the applicable telecommunications networks are 5G networks.

As shown in FIG. 5, the process 500 includes interactions between devices implementing functionality of the HPLMN 420 (i.e., a first operator's network), devices implementing functionality of the VPLMN 430 (i.e., a second operator's network), and a roaming control system 520 associated with the HPLMN 420. The process 500 begins when a UE device attaches to a VPLMN at step 501. The attachment request is received at an MME 502 associated with the VPLMN 430. Since the UE device is requesting to establish a connection as a visiting device rather than as a device registered to the network in which the MME 502 operates, the MME 502 passes the attachment request to a DEA 504 associated with the VPLMN 430. The DEA 504 transmits a message, at step

503, to a corresponding DEA 514 associated with the HPLMN 420 to notify the HPLMN of the UE's request to attach to the VPLMN 430.

The DEA 514 routes a message to a roaming control system 520 associated with the HPLMN 420 to enable the roaming control system 520 to determine whether to allow the UE to attach to the VPLMN 430. In some implementations, the DEA 514 routes the message to the roaming control system 520 in step 505, in which a copy of the message received from the DEA 504 is transmitted to the roaming control system 520. In other implementations, the DEA 514 routes the message through the HPLMN's HSS 516 at step 507, causing the HSS 516 in turn to pass either a copy of the received message or a message formatted according to the S6A protocol to the roaming control system 520. In still other implementations, the DEA 514 directly routes an S6A message to the roaming control system 520.

A roaming controller 522 in the roaming control system 520 maintains mappings between UE devices and roaming permissions for each device. When the roaming controller 522 receives the roaming request message routed through the DEA 514, the controller 522 determines whether to grant or deny the roaming request based on the mappings. The roaming controller 522 queries account information associated with the UE to determine if the UE is authorized to access any roaming networks. For example, the roaming controller 522 queries, at step 511, an account record 524 (maintained, for example, by a billing system or a provisioning system associated with the telecommunications network) to determine if the UE is authorized to access a roaming network. In some implementations, the account record 524 will include information about the particular roaming networks the UE is authorized to access (if any), such as identifiers of the geographic region(s) in which the authorized roaming networks operate, an identifier of the operator of the telecommunications network that is authorized for use as a roaming network, or other relevant information.

The mappings maintained between UE devices and roaming positions can include one-to-one mappings between individual UE devices and individual geographic regions in which each device is permitted to roam, many-to-one mappings between groups of UE devices and individual geographic regions in which devices in the group are permitted to roam, one-to-many mappings between individual UE devices and groups of geographic regions in which each device is permitted to roam, or many-to-many mappings. The identifiers of UE devices used in the mappings can include identifiers of the UE devices themselves (e.g., an International Mobile Station Equipment Identity (IMEI), identifiers of subscriber identity modules (e.g., an International Mobile Subscriber Identity (IMSI), telephone numbers or ranges of telephone numbers, identifiers of users of the devices, or other such identifiers. These UE device identifiers can be mapped to geographic identifiers such as tracking area codes (TACs), which are identifiers defined within the first or second telecommunications network for each of a plurality of tracking areas covered by the respective networks. Other types of geographic identifiers that can be mapped to UE device identifiers in addition to or instead of TACs include, for example, zip codes, county identifiers, region identifiers, city identifiers, or state identifiers.

The roaming controller 522 further queries the MME 502 (associated with the VPLMN 430) for location information at step 513. In some implementations, the roaming controller 522 uses an Insert Subscriber Data Request (IDR) command to retrieve the location information. The location information that is retrieved can include, for example, geographic coordinates of the UE at the time of the roaming request, geographic coordinates of the NAN to which the UE is requesting to attach, or an identifier of a geographic region in which the NAN is located.

The roaming control system 520 applies decision logic 526 to determine whether to allow the UE roaming access to the VPLMN 430. If the UE is authorized to access a roaming network in the particular geographic region where the access is requested, the decision logic 526 causes the roaming control system 520 to output an approval of the registration request at step 515. If the UE is not authorized to access any roaming networks, or if the UE is requesting access to a roaming network in a non-approved geographic region, the decision logic 526 causes the roaming control system 520 to output a denial of the registration request at step 517.

The selective roaming process 600 shown in FIG. 6, as an example implementation of the process in a 5G network, is similar to the process 500 illustrated in FIG. 5 and similarly includes interactions between devices implementing functionality of the HPLMN 420, devices implementing functionality of the VPLMN 430, and a roaming control system 520 associated with the HPLMN 420.

Like the process 500, the process 600 begins when a UE device attaches to a VPLMN at step 601. The attachment request is received at an AMF 602 associated with the VPLMN 430. The AMF 602 passes the attachment request to a SEPP 604 associated with the VPLMN 430, which in turn transmits a message (step 603) to a corresponding SEPP 614 associated with the HPLMN 420 to notify the HPLMN of the UE's request to attach to the VPLMN 430.

The SEPP 614 routes a message to the roaming control system 520 to enable the roaming control system 520 to determine whether to allow the UE to attach to the VPLMN 430. As in the process 500, different implementations of the SEPP 614 route the message to the roaming control system 520 in different ways, including the SEPP 614 routing a copy of the message directly to the roaming control system 520 (step 605), the SEPP 614 routing the message through the HPLMN's UDM 616 (step 607), or the SEPP 614 directly routing an S6A message to the roaming control system 520 (step 609).

The roaming controller 522 determines whether to grant or deny a roaming request based on (1) whether the UE is authorized to access roaming networks, and (2) whether the UE is authorized to use a roaming network in the particular geographic region in which the UE is requesting access. The roaming controller 522 can query the account record 524 at step 611 for roaming authorization and the AMF 602 at step 613 for location information, which are input to the decision logic 526 to determine whether to allow the UE roaming access to the VPLMN 430. If the UE is authorized to access a roaming network in the particular geographic region where the access is requested, the decision logic 526 causes the roaming control system 520 to output an approval of the registration request at step 615. If the UE is not authorized to access any roaming networks, or if the UE is requesting access to a roaming network in a non-approved geographic region, the decision logic 526 causes the roaming control system 520 to output a denial of the registration request at step 617.

Disabling Roaming in Overlapping Coverage Area

When a telecommunications network allows a UE device to attach to a roaming network, the telecommunications network needs a mechanism to bring the UE device back to the home network when roaming is no longer needed. As described in the following, the UE device can be forced to reattach to the home network when the UE device is located in an overlapping coverage area, which is a geographic area in which coverage is available from both the home network and the roaming network. However, determining the UE device is in an overlapping coverage area represents merely an example policy under which the device is brought back to the home network. The telecommunications network can apply other policies, in addition to or instead of, the overlapping coverage policy. For example, the telecommunications network may allow the UE device to remain attached to a roaming network until the signal strength of the home network is greater than the signal strength available from the roaming network. In another example, the telecommunications network determines whether to allow the UE device to remain attached to the roaming network based on services being utilized by the UE. If, for example, the roaming network is a 5G network while the home network is a 4G network, the telecommunications network may permit the UE device to continue using the roaming network when the UE device is accessing a data-heavy application that requires low latency.

Figure 7:
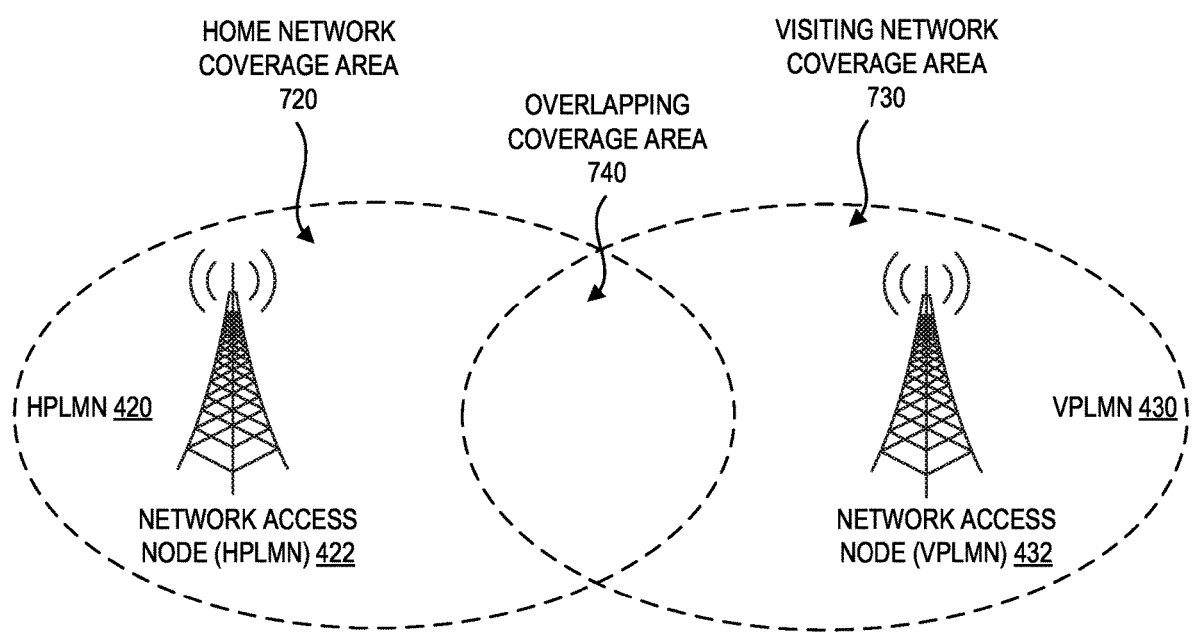
FIG. 7 illustrates an example overlapping coverage area between a home public land mobile network and a visiting public land mobile network.

FIG. 7 illustrates example coverage areas of the HPLMN 420 (a "home network coverage area 720") and the VPLMN 430 (a "visiting network coverage area 730"). In some areas, the home network coverage area 720 and the visiting network coverage area 730 overlap, creating an overlapping coverage area 740. Each of the coverage areas 720, 730, 740 can include one or more tracking areas, each represented by a respective tracking area code. When a UE has been allowed access to the VPLMN 430 (e.g., because the UE is located within the visiting network coverage area 730), the HPLMN 420 monitors for movement of the UE into the overlapping coverage area 740. When the UE is determined to have moved into the overlapping coverage area 740, the HPLMN 420 initiates a process to return the UE to the home network rather than continuing to allow the UE to access the roaming network.

Figure 8:
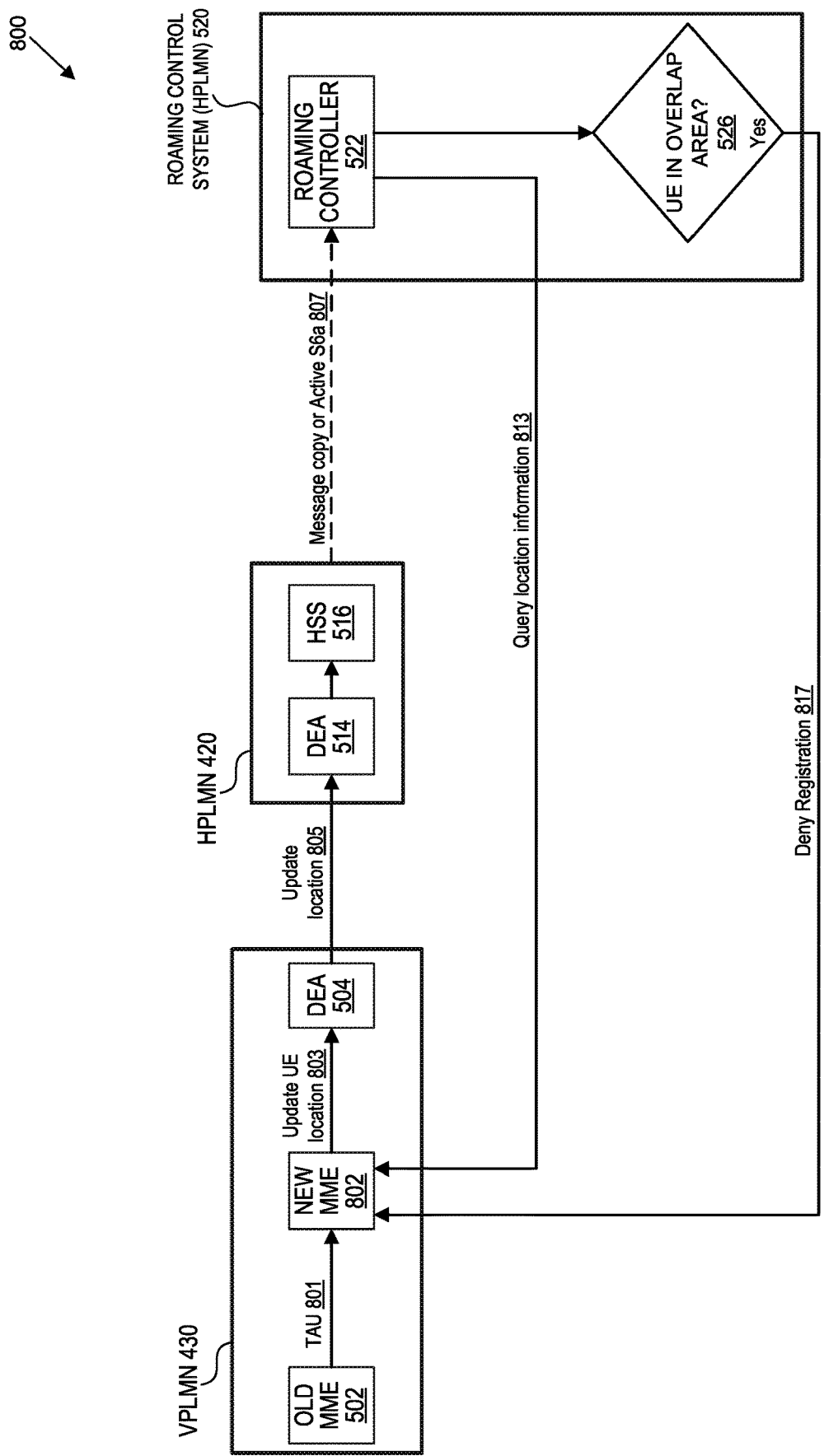
FIG. 8 illustrates a first example process to disconnect a user equipment device from a roaming network, according to some implementations.

FIG. 8 illustrates a first example process 800 to disconnect a UE from a roaming network when the UE is located in an overlapping coverage area between an HPLMN and a VPLMN. In general, the process in FIG. 8 includes steps that are similar to steps of the processes for connecting a UE to a roaming network described in FIGS. 5 and 6, but instead detects that a UE has moved from a coverage area of the roaming network to an overlapping coverage area between the roaming network and the home network.

As shown in FIG. 8, the process 800 begins when a UE issues a tracking area update request 801 that causes the UE to detach from an old MME 502 and attach to a new MME 802. The new MME 802 passes the attachment request to the DEA 504 at step 803, which in turn transmits a message (at step 805) to the DEA 514 associated with the HPLMN 420 to notify the HPLMN of the UE's request to attach to the new MME 802. The DEA 514 routes a message to the roaming control system 520 to enable the roaming control system to determine whether to allow the UE to attach to the new MME 802. As in the processes described in FIGS. 5 and 6, the message can be routed between the DEA 514 and the roaming control system 520 in various ways, including directly transmitting a copy of the attachment request from the DEA 514, causing the HSS 516 to transmit a copy of the attachment request, or sending an S6a message via the DEA 514 or HSS 516 to the roaming control system 520.

The roaming controller 522 queries the new MME 802 for location information associated with the UE at step 813. The location information can include, for example, a tracking area code identifying a tracking area in which the UE is located, global positioning coordinates of the UE, an identity of a NAN to which the UE is communicatively coupled, and/or other location identifiers that can be used by the roaming controller 522 to determine the location of the UE.

The decision logic 526 is applied by the roaming control system 520 to determine if the UE has moved into the overlapping coverage area between the VPLMN and the HPLMN. In various implementations, the roaming control system 520 determines the UE has moved into the overlapping coverage area 740 by determining a tracking area code used by the UE is associated with a tracking area in the overlapping coverage area 740. Alternatively, the roaming control system 520 determines based on global positioning coordinates or other location identifiers that the UE is located within an explicit boundary region defining the overlapping coverage area 740, within a boundary of the coverage area of the HPLMN, within a communicable distance to a NAN associated with the HPLMN (such as the NAN 422), etc. For example, the roaming controller 522 accesses a data record that defines a location of a geographic boundary around the overlapping coverage area or the coverage area of the HPLMN. The decision logic 526 causes the roaming control system 520 to determine the UE has moved into the overlapping coverage area if the geographic location of the UE is inside an area defined by the boundary or less than a threshold distance outside the boundary.

If the UE is determined to be located within a coverage area of the HPLMN (including in the overlapping coverage area), the roaming control system 520 denies the registration of the UE to the new MME 802 at step 817. Once the UE has been denied registration to the new MME 802, a registration to the HPLMN can be initiated to allow the UE to continue operating on its home network.

Figure 9:
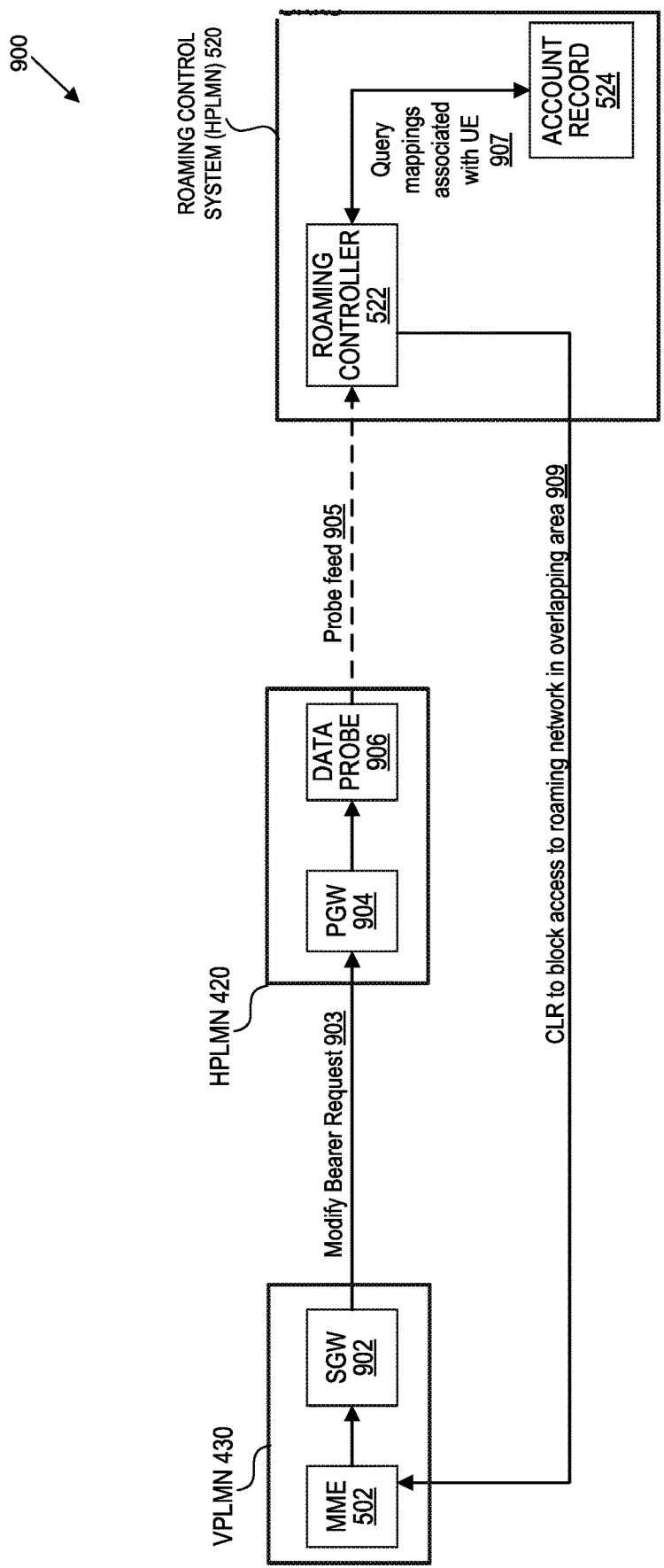
FIG. 9 illustrates a second example process to disconnect a user equipment device from a roaming network, according to some implementations.

FIG. 9 illustrates a second example process 900 to disconnect a UE from a roaming network. The process 900 can be performed, for example, when the UE does not issue a tracking area update (e.g., because the UE can remain attached to the original MME 502 when it moves into the overlapping coverage area). However, the process 900 can also be performed when the UE attaches to a new MME.

As shown in FIG. 9, an SGW 902 associated with the VPLMN 430 transmits a modify bearer request (MBR) 903 to a PGW 904 associated with the HPLMN 420. The MBR 903 is triggered, for example, when the MME 502 detects the UE has moved.

The PGW 904 interfaces with a data probe 906, which is configured for example as a proxy server that monitors MBRs received from the VPLMN 430. The data probe 906 communicates a feed of information to the roaming controller 522 at step 905, including any received MBRs.

The roaming controller 522 decodes user location information (ULI) from the feed of information received from the data probe 906. The ULI includes an identifier of the UE and the location of the UE (e.g., as a tracking area code). If the location of the UE falls within the overlapping area between the VPLMN 430 and the HPLMN 420 (as determined, for example, according to any of the processes described above with respect to FIG. 8), the roaming controller 522 outputs a command to block the UE's access to the roaming network at step 909. For example, the roaming controller 522 sends the MME 502 a cancel-location-request (CLR) message to withdraw the UE's subscription to the roaming MME 502.

Figure 10:
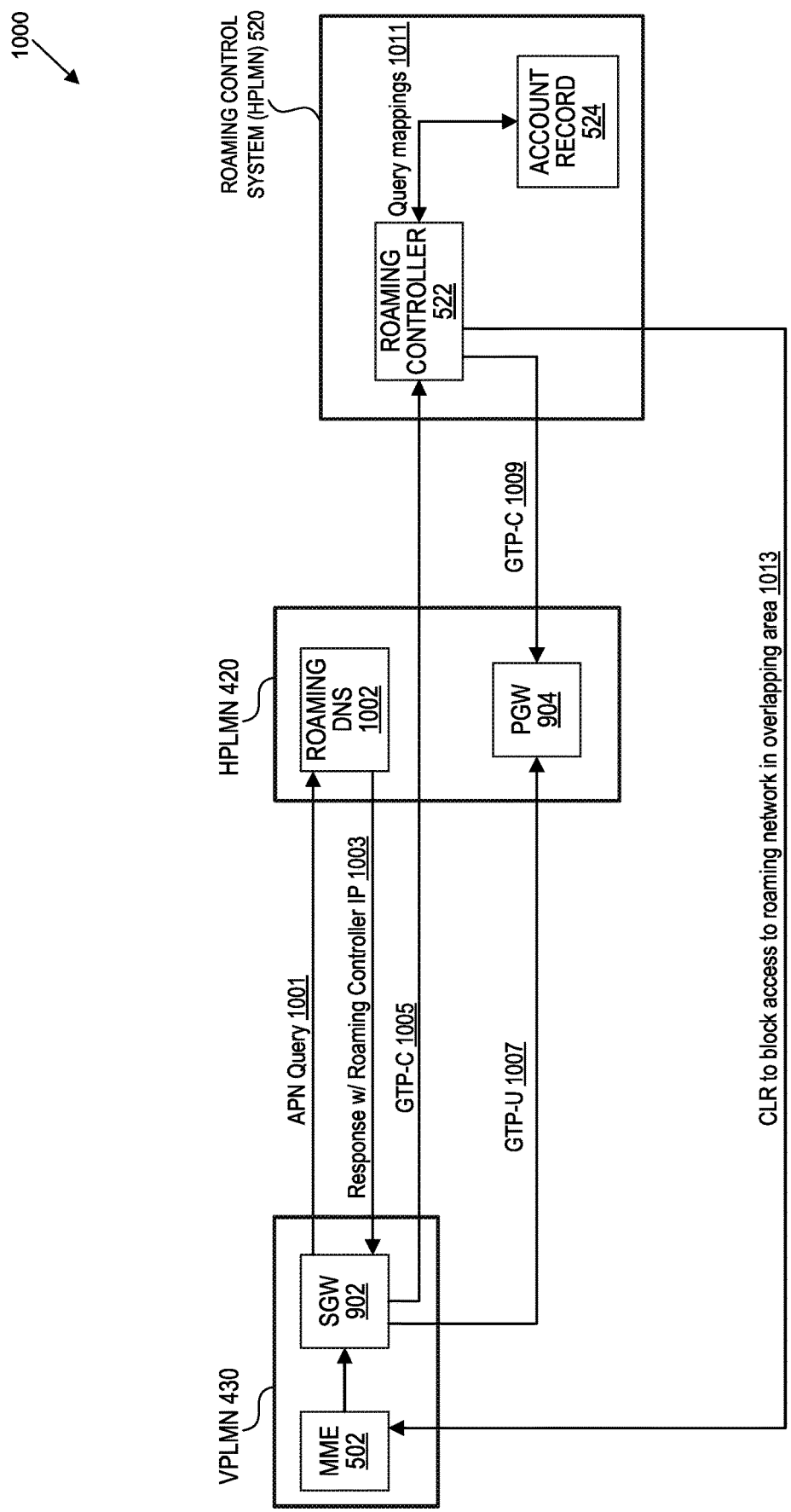
FIG. 10 illustrates a third example process to disconnect a user equipment device from a roaming network, according to some implementations.

FIG. 10 illustrates a third example process 1000 to disconnect a UE from a roaming network. Like the process 900 described with respect to FIG. 9, the process 1000 can be performed regardless of whether the UE issues a tracking area update. In general, the process 1000 configures the roaming controller 522 as a network proxy device that receives data about location changes of the UE and causes the UE's subscription to the roaming network to be canceled when the UE enters the overlapping area between the VPLMN 430 and the HPLMN 420.

At step 1001, the SGW 902 associated with the VPLMN 430 issues a query for an access point name (APN) for a gateway that is usable by the UE to access a computer network other than the VPLMN 430. The APN query 1001, which can be issued by the SGW 902 at any point while the UE is attached to the VPLMN 430, is intercepted by a roaming domain name server (DNS) 1002 associated with the HPLMN 420. The roaming DNS 1002 responds to the APN query 1001 with an IP address of the roaming controller 522, to configure the roaming controller 522 as a network proxy. In particular, some implementations of the roaming controller 522 function as a general packet radio service (GPRS) tunnelling protocol (GTP) controller that interfaces with the SGW 902 and PGW 904. In the roaming controller's function as a GTP controller, the SGW 902 transmits GTP control (GTP-C) messages to the roaming controller 522 at step 1005 and GTP user data tunneling (GTP-U) messages to the PGW 904 at step 1007. Likewise, the roaming controller 522 sends GTP-C messages to the PGW 904 at step 1009. When the VPLMN is a 5G network, the roaming controller 522 can similarly interface with an SMF and UPF within the roaming telecommunications network.

When the UE changes location, a command to modify the UE's session is transmitted from the SGW 902 to the roaming controller 522 as the GTP-C command 1005. For example, a modify bearer request is sent via the GTP-C plane to the roaming controller 522. Upon receiving the request, the roaming controller 522 queries the account record 524 at step 1011 to determine if the new location of the UE is within the overlapping coverage area between the VPLMN and the HPLMN. If so, the roaming controller 522 is a command, at step 1013, to block the UE's access to the roaming network. For example, the roaming controller 522 sends the MME 502 a cancel-location-request (CLR) message to withdraw the UE's subscription to the roaming MME 502.

Although the processes 800, 900, and 1000 are described with respect to components and functions of a 4G LTE network, similar processes can be implemented using analogous components and functions of a 5G NR network, or with a mix of components and functions of a 4G network and a 5G network.

Computer System

Figure 11:
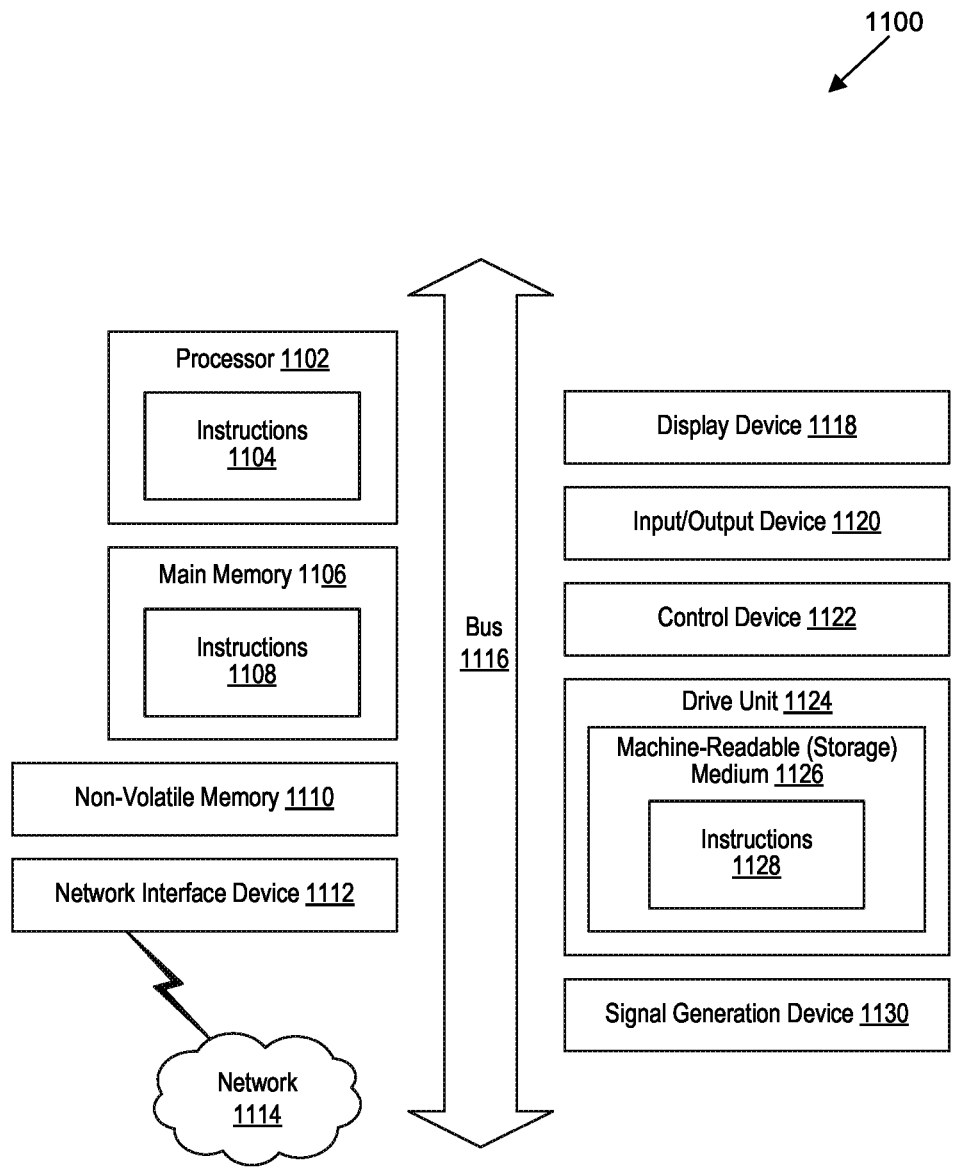
FIG. 11 is a block diagram that illustrates an example of a computer system in which at least some operations described herein can be implemented.

FIG. 11 is a block diagram that illustrates an example of a computer system 1100 in which at least some operations described herein can be implemented. As shown, the computer system 1100 can include: one or more processors 1102, main memory 1106, non-volatile memory 1110, a network interface device 1112, video display device 1118, an input/output device 1120, a control device 1122 (e.g., keyboard and pointing device), a drive unit 1124 that includes a storage medium 1126, and a signal generation device 1130 that are communicatively connected to a bus 1116. The bus 1116 represents one or more physical buses and/or point-to-point connections that are connected by appropriate bridges, adapters, or controllers. Various common components (e.g., cache memory) are omitted from FIG. 11 for brevity. Instead, the computer system 1100 is intended to illustrate a hardware device on which components illustrated or described relative to the examples of the figures and any other components described in this specification can be implemented.

The computer system 1100 can take any suitable physical form. For example, the computing system 1100 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1100. In some implementation, the computer system 1100 can be an embedded computer system, a system-on-chip (SOC), a single-board computer system (SBC) or a distributed system such as a mesh of computer systems or include one or more cloud components in one or more networks. Where appropriate, one or more computer systems 1100 can perform operations in real-time, near real-time, or in batch mode.

The network interface device 1112 enables the computing system 1100 to mediate data in a network 1114 with an entity that is external to the computing system 1100 through any communication protocol supported by the computing system 1100 and the external entity. Examples of the network interface device 1112 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1106, non-volatile memory 1110, machine-readable medium 1126) can be local, remote, or distributed. Although shown as a single medium, the machine-readable medium 1126 can include multiple media (e.g., a centralized/distributed database and/or associated caches and servers) that store one or more sets of instructions 1128. The machine-readable (storage) medium 1126 can include any medium that is capable of storing, encoding, or carrying a set of instructions for execution by the computing system 1100. The machine-readable medium 1126 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1110, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1104, 1108, 1128) set at various times in various memory and storage devices in computing device(s). When read and executed by the processor 1102, the instruction(s) cause the computing system 1100 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

This patent application is related to U.S. patent application Ser. No. 17/897,075, filed Aug. 26, 2022, now U.S. Pat. No. 12,225,623, which is incorporated herein by reference in its entirety. In addition, any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A system comprising:
   at least one hardware processor; and
   at least one non-transitory memory storing instructions, which, when executed by the at least one hardware processor, cause the system to:
   monitor a Modify Bearer Request (MBR) generated by a first cellular network for a wireless device,
      wherein the first cellular network is operating as a roaming network for the wireless device,
      wherein the wireless device is registered to operate on a second cellular network, and
      wherein the first cellular network and second cellular network each have a respective coverage area;
   without receiving a tracking area update from the wireless device, decode the MBR to determine user location information associated with the wireless device; and
   in response to the user location information indicating the wireless device is located in an overlapping area between the coverage area of the first cellular network and the coverage area of the second cellular network, issue a cancel location request to cause the wireless device to disconnect from the first cellular network.

2. The system of claim 1, wherein monitoring the MBR comprises:
receiving the MBR via a data probe coupled to a gateway associated with the second cellular network.

3. The system of claim 1, wherein the instructions when executed further cause the system to:
interface with a serving gateway (SGW) associated with the first cellular network to receive general packet radio service (GPRS) tunnelling protocol control plane (GTP-C) messages over the interface;
wherein the MBR is transmitted via one of the GTP-C messages.

4. The system of claim 1, wherein the instructions when executed further cause the system to:
interface with a device implementing a session management function (SMF) associated with the first cellular network to receive general packet radio service (GPRS) tunnelling protocol control plane (GTP-C) messages over the interface;
wherein the MBR is transmitted via one of the GTP-C messages.

5. The system of claim 1, wherein the user location information includes a tracking area code indicating a tracking area in which the wireless device is located, and wherein the instructions further cause the system to:
access a data record that includes one or more tracking areas that are within the overlapping area; and
determine the wireless device is located in the overlapping area if the tracking area code corresponds to one of the tracking areas within the overlapping coverage area.

6. The system of claim 1, wherein the user location information includes a tracking area code indicating a tracking area in which the wireless device is located, and wherein the instructions further cause the system to:
access a data record that includes one or more tracking areas that are within the coverage area of the second cellular network; and
determine the wireless device is located in the overlapping area if the tracking area code corresponds to one of the tracking areas within the coverage area of the second cellular network.

7. The system of claim 1, wherein the instructions further cause the system to:
access a data record that defines a geographic boundary around the coverage area of the second cellular network; and
determine the wireless device is located in the overlapping area if the user location information indicates the wireless device is inside the geographic boundary defined in the data record.

8. A non-transitory computer-readable storage medium comprising instructions recorded thereon, wherein the instructions when executed by at least one data processor of a system, cause the system to:
monitor changes in location of a user equipment (UE) device while the UE device is subscribed to a roaming telecommunications network,
wherein the UE device is registered to operate on a home telecommunications network different from the roaming telecommunications network, and
wherein each of the roaming telecommunications network and the home telecommunications network have a coverage area; and
without receiving a tracking area update from the UE device, in response to detecting the UE device has moved from a first geographic location that is within the coverage area of the roaming telecommunications network and not the home telecommunications network, to a second geographic location that is within both the coverage area of the roaming telecommunications network and the coverage area of the home telecommunications network, generate a command to cancel the subscription of the UE device to the roaming telecommunications network.

9. The non-transitory computer-readable storage medium of claim 8, wherein monitoring changes in the location of the UE device comprises:
receiving a Modify Bearer Request (MBR) via a data probe coupled to a gateway associated with the roaming telecommunications network; and
decoding the MBR to determine a new location of the UE device.

10. The non-transitory computer-readable storage medium of claim 8, wherein monitoring changes in the location of the UE device comprises:
interfacing with a serving gateway (SGW) associated with the roaming telecommunications network to receive general packet radio service (GPRS) tunnelling protocol control plane (GTP-C) messages over the interface; and
decoding a message of the received GTP-C messages to determine a new location of the UE device.

11. The non-transitory computer-readable storage medium of claim 8, wherein the instructions when executed further cause the system to:
interface with a device implementing a session management function (SMF) associated with the roaming telecommunications network to receive general packet radio service (GPRS) tunnelling protocol control plane (GTP-C) messages over the interface; and
decode a message of the received GTP-C messages to determine a new location of the UE device.

12. The non-transitory computer-readable storage medium of claim 8, wherein monitoring changes in the location of the UE device comprises receiving a tracking area code indicating a tracking area in which the UE device is located, and wherein the instructions further cause the system to:
access a data record that includes one or more tracking areas that are within both the coverage area of the roaming telecommunications network and the coverage area of the home telecommunications network; and
determine the UE device is located in an overlapping area if the tracking area code corresponds to one of the tracking areas within both the coverage area of the roaming telecommunications network and the coverage area of the home telecommunications network.

13. The non-transitory computer-readable storage medium of claim 8, wherein generating the command to cancel the subscription of the UE device to the roaming telecommunications network comprises generating a cancel location request (CLR) message.

14. A non-transitory, computer-readable storage medium comprising instructions recorded thereon, wherein the instructions when executed by at least one data processor of a system, cause the system to:

monitor changes in location of a user equipment (UE) device while the UE device is subscribed to a first telecommunications network;

interface with a device implementing a session management function (SMF) associated with the first telecommunications network to receive general packet radio service (GPRS) tunnelling protocol control plane (GTP-C) messages over the interface;

decode a message of the received GTP-C messages to determine a new location of the UE device;

communicate a request to update a location of the UE device, in response to determining the new location of the UE device, to a second telecommunications network that operates as a home network for the UE device; and if a response to the request to update the location of the UE device indicates the UE device has moved into an area of overlapping coverage area between the first telecommunications network and the second telecommunications network, cancel the subscription of the UE device to the first telecommunications network.

15. The non-transitory, computer-readable storage medium of claim 14, wherein the instructions further cause the system to:

receive, in a first telecommunications network, a tracking area update for a user equipment (UE) device subscribed to operate on the first telecommunications network as a roaming network, wherein the tracking area update is received from a mobility management entity (MME) associated with the first telecommunications network.

16. The non-transitory, computer-readable storage medium of claim 15, wherein the tracking area update is received from a device implementing an access and mobility management function (AMF) associated with the first telecommunications network.

17. The non-transitory, computer-readable storage medium of claim 14, wherein the request to update the location of the UE device is communicated to a diameter edge agent (DEA) associated with the second telecommunications network.

18. The computer-readable storage medium of claim 14, wherein the request to update the location of the UE device is communicated to a security edge protection proxy (SEPP) associated with the second telecommunications network.

19. The non-transitory, computer-readable storage medium of claim 14, wherein the response to the request to update the location of the UE device comprises a cancel location request (CLR) message.

* * * * *